June 8, 1937.  P. T. KEEBLER ET AL  2,082,959
MOTOR
Filed April 17, 1935  3 Sheets-Sheet 1
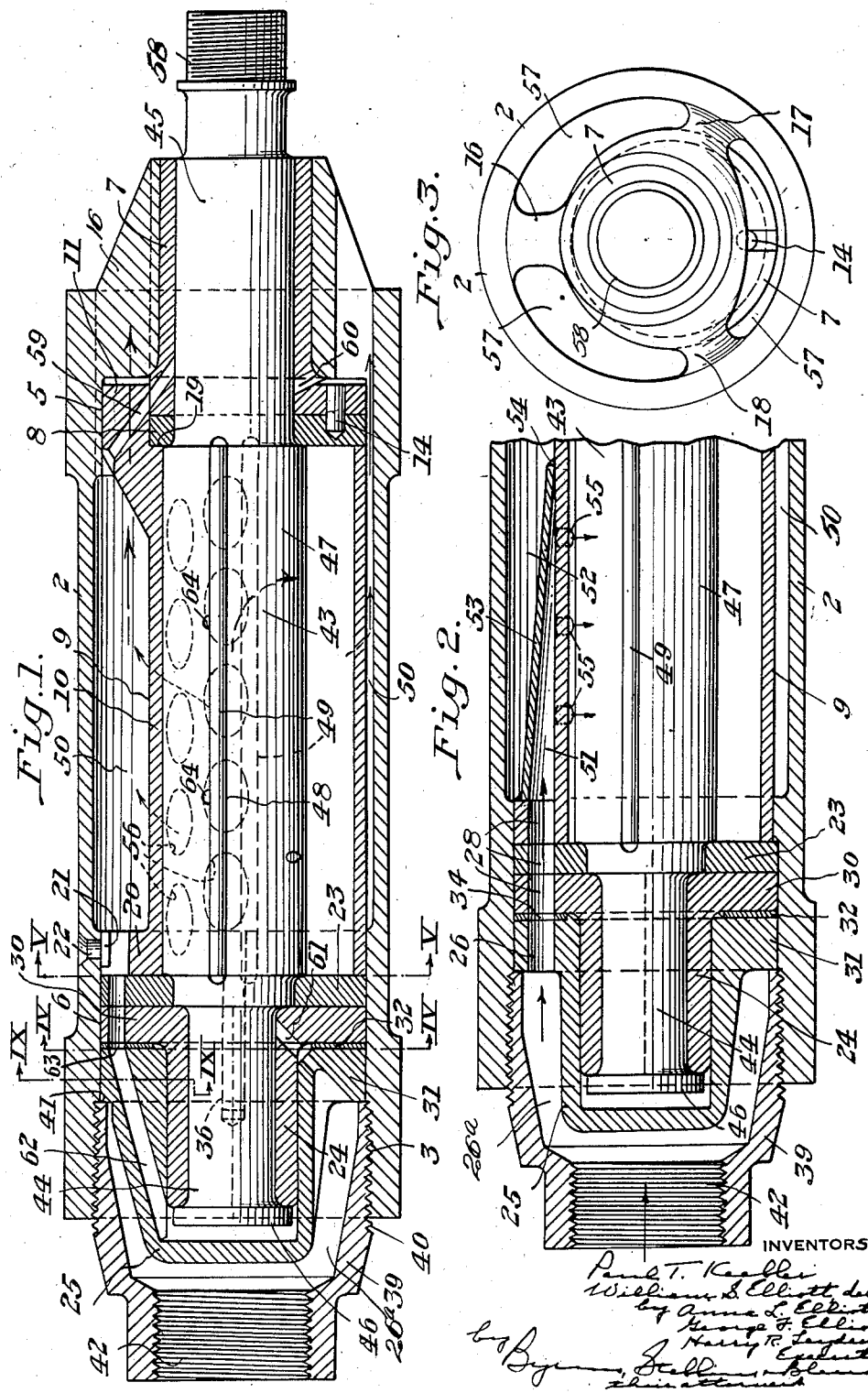

June 8, 1937.　　　P. T. KEEBLER ET AL　　　2,082,959
MOTOR
Filed April 17, 1935　　　3 Sheets-Sheet 2
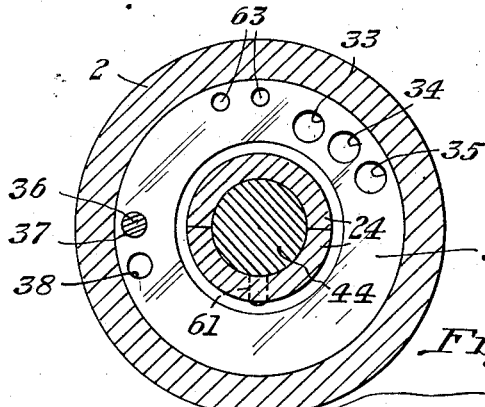
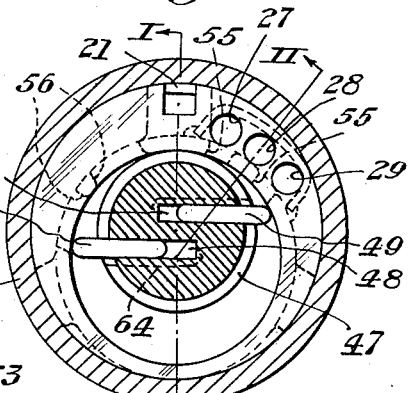
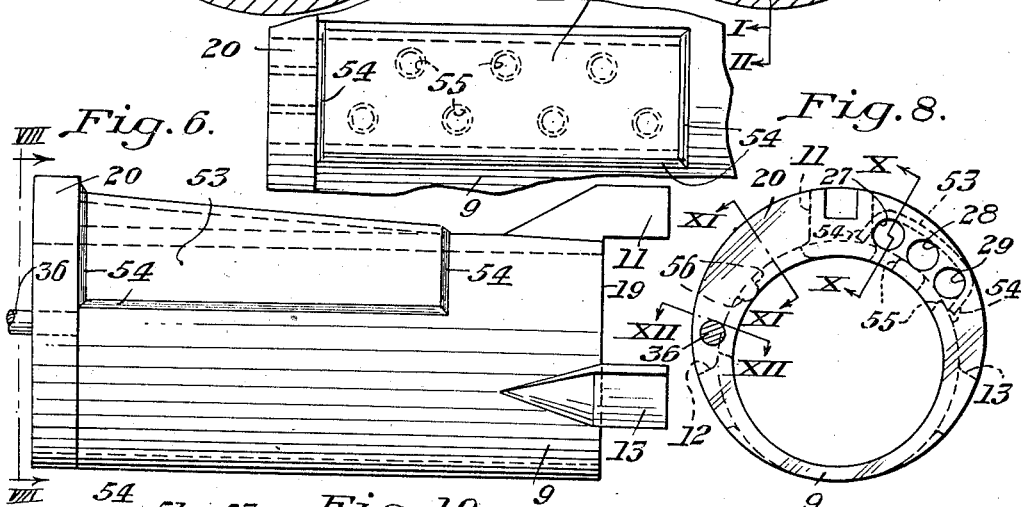
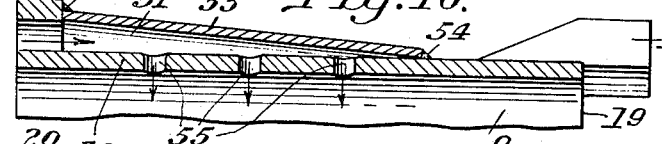
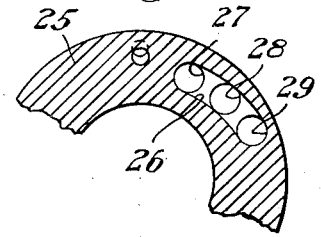
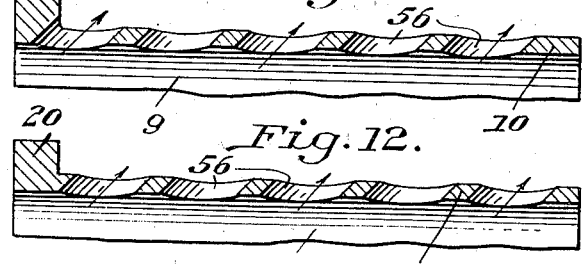

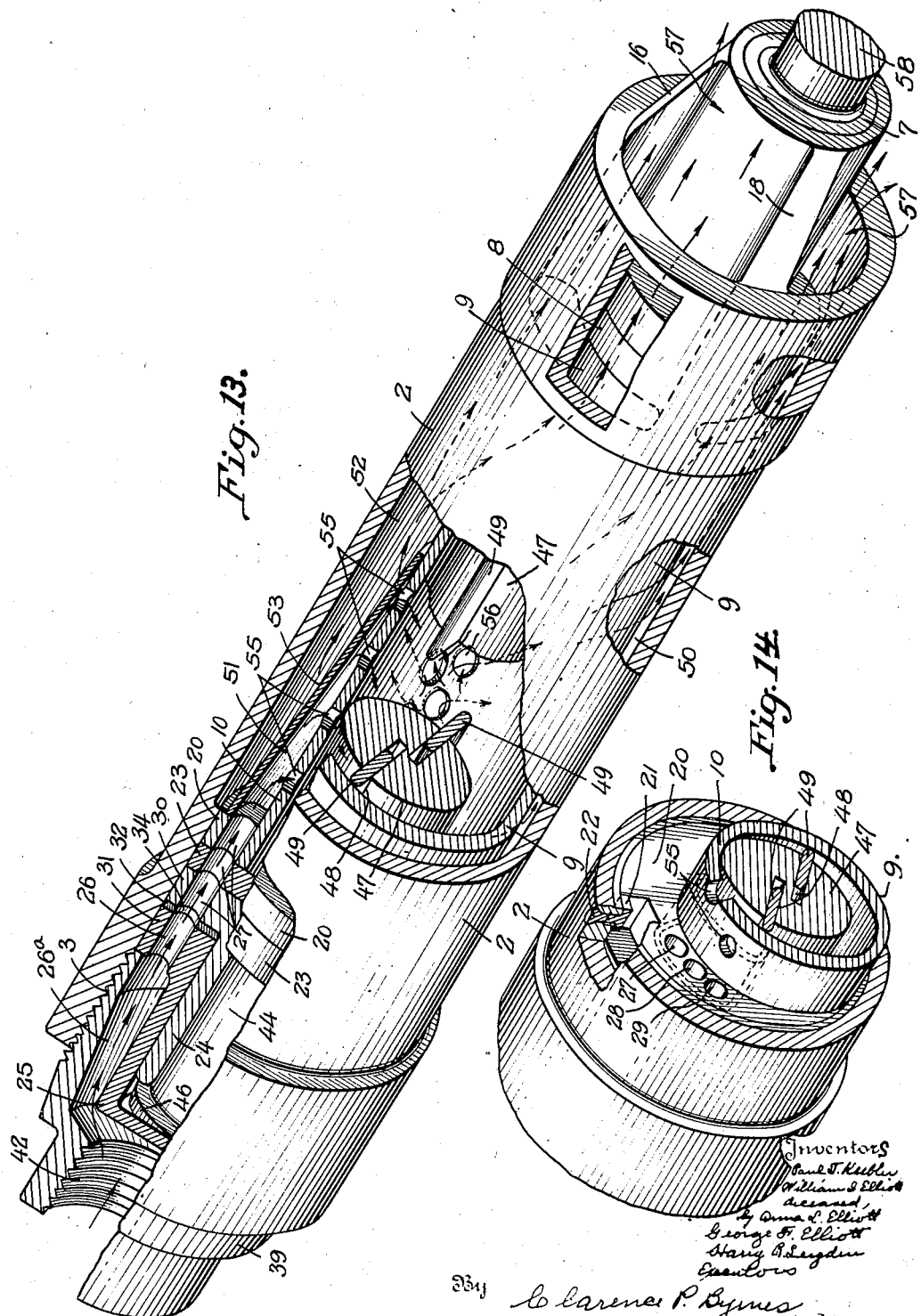

Patented June 8, 1937

2,082,959

UNITED STATES PATENT OFFICE 2,082,959

MOTOR

Paul T. Keebler, Jeannette, Pa., and William S. Elliott, deceased, late of Pittsburgh, Pa., by Anna L. Elliott, Pittsburgh, George F. Elliott, Ridgway, and Harry R. Leyden, Buck Hill Falls, Pa., executors, assignors to Elliott Company, Pittsburgh, Pa., a corporation of Pennsylvania Application April 17, 1935, Serial No. 16,780

5 Claims. (Cl. 121—34)

The present invention relates broadly to motors, and more particularly to rotary fluid motors. In certain of its more specific aspects the invention relates to rotary fluid motors of the type adapted for passage through tubes to operate tube cleaner cutting heads. Motors of this type are used very extensively for operating tube cleaner heads of the rotary type.

Purely for purposes of explanation and illustration the invention will be described as embodied in a rotary fluid motor for operating centrifugal tube cleaners, although it will be appreciated that many, if not all, of the features of the invention may also be used to advantage in motors designed for other purposes. The particular motor shown in the drawings and which will be used as a basis for the description is an air motor, although certain of the features of the invention are also applicable to motors driven by other fluids such as steam or water.

The motor shown in the drawings is of the well known Elliott type such as shown in Patent 1,979,537 but embodies a number of entirely new features which obtain important advantages and economies. A motor of relatively extremely light weight is provided which develops exceptionally great power not only for a motor of its weight but also for a motor of the same size regardless of weight. Overheating of the motor even under the most severe conditions is practically eliminated. The back pressure on the motor is materially reduced, resulting in increased power and also in relatively great expansion of the exhaust fluid before it leaves the motor. This relatively great expansion results in a lowering of the temperature within the motor.

The motor is so constructed that the exhaust fluid acts as a cooling agent for the cylinder and rotor, and in the particular motor shown in the drawings the exhaust fluid completely surrounds the cylinder, although important advantages in preventing overheating can be obtained if the exhaust fluid is disposed about at least one-third of the perimeter of a section of the inner surface of the casing or one-third of the perimeter of a section of the outer surface of the cylinder. It is preferred to bring the exhaust fluid into contact with the casing throughout at least the major portion of the perimeter of a section of the outer surface of the cylinder.

The cylinder is so mounted within the casing as to be at least partially spaced therefrom and the cylinder is preferably made so that the thickness of the metal of at least a portion of the body thereof is substantially uniform. Means are provided for spacing the cylinder from the casing, the space between the cylinder and casing comprising the exhaust space. As the exhaust space extends about a relatively great portion of the cylinder, the exhaust outlets to the outside of the casing are conveniently arranged about a relatively great portion of the casing circumferentially thereof. Thus at the same time the back pressure is reduced by reason of an important increase in the area of the exhaust passages and the relatively cool exhaust fluid is brought into heat transfer relationship with the exterior of the cylinder to a relatively great extent, resulting in the advantages above mentioned.

The inlet fluid is also preferably delivered into the space between the cylinder and casing, but means are provided for segregating the inlet fluid and the exhaust fluid. Conveniently a partition member may be connected with the outside of the cylinder so as to confine the inlet fluid within a relatively small portion of the space between the cylinder and casing, the inlet fluid passing from such space through ports in the cylinder wall. Means are also provided enabling adjustment of the capacity of the motor by controlling the amount of inlet fluid which will reach the cylinder. This is preferably done by controlling the area of the inlet passages, a plate being provided which is rotatable to open or close portions thereof. Also, the exhaust passages from the cylinder to the space between the cylinder and casing are directed generally toward the outlet end of the casing and are of relatively very great cross-sectional area, this further reducing the back pressure and the resistance to outflow of the exhaust fluid. The outlet passages to the outside of the casing are likewise of relatively very great cross-sectional area. The increase in the cross-sectional area of the exhaust passages leading from the cylinder to the casing and the outlet passages leading to the outside of the casing is made possible by the provision of a cylinder of the type above mentioned.

The construction and assembly of the motor are facilitated by the use of the structure above mentioned and the motor is rendered more reliable in operation, particularly under heavy loads and at high speeds. The motor, on acount of its decreased weight, is relatively easy to handle; and on account of its relatively great power it is suitable for uses for which very large heavy motors have previously been required.

Other details, objects and advantages of the invention will become apparent as the following description of a present preferred embodiment thereof proceeds.

In the accompanying drawings there is shown a present preferred embodiment of the invention, in which Figure 1 is a longitudinal cross-sectional view of a motor taken on the line I—I of Figure 5 with the rotor in full lines;

Figure 2 is a partial longitudinal cross-sectional view of the motor taken on the line II—II of Figure 5 with the rotor in full lines;

Figure 3 is an end view of the motor, viewing the same from the right-hand end of Figure 1;

Figure 4 is a transverse cross-sectional view taken on the line IV—IV of Figure 1;

Figure 5 is a transverse cross-sectional view taken on the line V—V of Figure 1;

Figure 6 is a side view of the cylinder;

Figure 7 is a partial plan view of the cylinder;

Figure 8 is an end view of the cylinder, with the dowel-pin in section on the line VIII—VIII of Figure 6;

Figure 9 is a partial transverse cross-sectional view taken on the line IX—IX of Figure 1;

Figure 10 is a partial longitudinal cross-sectional view taken on the line X—X of Figure 8;

Figure 11 is a partial longitudinal cross-sectional view taken on the line XI—XI of Figure 8; and Figure 12 is a partial longitudinal cross-sectional view taken on the line XII—XII of Figure 8.

Figure 13 is a perspective view of the motor, with parts broken away to show the flow of fluid through the motor.

Figure 14 is a detail perspective partially in section, showing the means for positioning the cylinder in the casing.

Referring now more particularly to the drawings, there is provided a generally cylindrical casing, designated generally by reference numeral 2, having one end interiorly threaded as at 3 and having its other end constructed in spider-like fashion, as shown in Figure 3. Interiorly the casing has front and rear machined annular centering portions 5 and 6, respectively.

Carried by the spider-like portion at the front of the casing is a front bearing or bushing 7. Disposed immediately behind the bushing 7 is a front washer 8. There is provided a cylinder, designated generally by reference numeral 9 and shown in detail in Figures 6, 7, 8, 10, 11, and 12, which cylinder has a body portion 10 of substantially cylindrical cross section and whose wall is of substantially uniform thickness both longitudinally and circumferentially. Connected with the front end of the cylinder and preferably machined integrally therewith are three feet 11, 12 and 13, respectively. The outer surfaces of these feet have a machined fit within the front centering portion 5 of the casing and the inner surfaces thereof have a similar fit with the bushing 7 and the washer 8. The bushing and washer are held against relative rotation by a dowel 14. The respective feet 11, 12 and 13 of the cylinder 9 are disposed substantially in longitudinal alignment with the respective ribs 16, 17 and 18 of the spider-like portion of the casing. The end 19 of the cylinder proper abuts longitudinally against the washer 8.

At its opposite extremity the cylinder has an eccentric flange 20 which has a machined fit within the centering portion 6 of the casing. A positioning member 21 is held against the inner surface of the centering portion 6 of the casing by a rivet 22 and interengages with a recess in the flange 20 of the cylinder to prevent relative rotation between the cylinder and the casing, see Figs. 5 and 14. A rear washer 23 abuts the end of the cylinder and a rear split bushing 24 abuts the washer. A rear guide or cap 25 covers a portion of the split bushing 24, while a flange on the bushing is seated against the washer 23.

A fluid inlet passage 26 in the cap 25 is adapted to communicate with three separate fluid inlet passages 27, 28 and 29 (see Fig. 5) extending through the flange 30 of the front bushing 24, the washer 23 and the flange 20 of the cylinder so that when all three of the passages 27, 28 and 29 are open the inlet fluid may pass through all of such passages simultaneously in parallel. There is interposed between a flange portion 31 of the cap 25 and the flange 30 of the bushing 24 a control member or plate 32 having therein three holes 33, 34 and 35, respectively, adapted in one position of the plate 32 to allow all three of the passages 27, 28 and 29 to open into the passage 26. The plate 32 may, however, be rotated to one or more other positions so as to close one or more of the passages 27, 28 and 29. For example, the plate 32 may be rotated toward the right, viewing Figure 4, until the hole 33 therethrough aligns with the passage 28 and the hole 34 aligns with the passage 29, the passage 27 being closed. Upon further rotation of the plate 32 the hole 33 may be brought into alignment with the passage 29, the passages 27 and 28 being closed. However, the plate as shown in Figure 4 is designed only for movement to two positions, namely, that shown in Figure 4 and a position in which the passage 27 only is closed.

A dowel 36 projects from the end of the cylinder and passes through dowel holes suitably provided in the washer 23, the bushing 24, the plate 32 and the cap 25 so as to hold all of these parts in their proper or aligned positions and against relative rotation. As shown in Figure 4, two dowel holes 37 and 38 are provided in the plate 32, one of such holes receiving the dowel 36 when the plate is in one of its positions and the other receiving the dowel when the plate is in the other of its positions. The plate may very readily be moved from one adjusted position to the other simply by removing the cap 25, raising the plate to clear the dowel 36, turning it to its new position and replacing it.

The parts within the casing are held in assembly longitudinally of the casing by a reducer or hollow plug member 39 exteriorly threaded at 40 and which is adapted to be threaded into the internally threaded end of the casing as shown in Figures 1, 2 and 13. The parts are so designed that the inner end 41 of the reducer abuts against the flange portion 31 of the cap 25 to exert longitudinal pressure which is transmitted to the opposite end of the casing through the plate 32, the bushing 24, the washer 23, the cylinder 9, the washer 8 and the bushing 7. The fluid for operating the motor is introduced through the internally threaded end collar portion 42 of the reducer into which a hose connection is adapted to be screwed. A fluid pressure chamber 26$^a$ formed between the interior of the reducer and the outer face of the cap 25, communicates with the passage 26 in the flange portion of the cap 25 as shown in Figure 2.

There is provided a rotor, designated generally by reference numeral 43 and which comprises reduced necks 44 and 45, respectively, which are journalled in the respective bushings 24 and 7.

The left-hand extremity of the rotor 43 has an enlarged flange 46, as shown in Figures 1 and 2, so that the bushing 24 must be a split bushing in order that it may be applied to the neck 44 of the rotor. The rotor has an enlarged central portion 47 which is provided with a pair of oppositely disposed offset eccentric grooves 48 each receiving a blade 49.

At the middle portion of the motor there is a space 50 between the cylinder and the casing which extends completely around the cylinder. This space is divided into a fluid pressure chamber 51 and an exhaust chamber 52 (see Figure 2) by a partition member 53 which may comprise a tapered hood welded to the outside of the cylinder at 54 (see Figures 2, 5, 6, 7, 8, 10 and 13). The partition member 53 encloses the three inlet passages 27, 28 and 29 and segregates the inlet fluid from the portion 52 of the space 50. As seen, the partition 53 in effect extends substantially longitudinally of the casing 2 and between the casing 2 and the cylinder wall 10, and inclinely converges from the fluid pressure chamber 51 to the exhaust chamber 52. Inlet ports 55 (see Figures 2, 5, 7, 8, and 10) are drilled through the wall of the cylinder to direct the inlet fluid into the interior of the cylinder. The inlet fluid enters through the reducer 39, the passage 26, one or more of the passages 27, 28 and 29, the space 51 and the ports 55. The fluid enters at high velocity and strikes the inclined partition member 53 which assists in directing it through the ports 55 with a minimum of impedance.

The cylinder 9 has at its exhaust side exhaust ports 56 which are of relatively very large size and are arranged in two rows, each row extending longitudinally of the cylinder, as shown in Figures 1 and 13. These exhaust ports also have their walls inclined generally toward the exhaust or right-hand end of the motor, viewing Figures 1 and 2, so as to give the exhaust fluid a very free unimpeded passage from the interior of the cylinder into the space 52 and toward the exhaust end of the motor. As stated, the exhaust ports 56 open into the space 52 which extends completely about the cylinder 9. Not only are the exhaust ports of exceptionally large cross-sectional area, but the volume of the space 52 is likewise exceptionally large so that the exhaust fluid is permitted to expand to a relatively great extent, which results in reduction of its temperature to a relatively low point. This, coupled with the fact that the exhaust fluid is in contact with the outer surface of the cylinder throughout substantially the entire perimeter thereof, results in a very marked cooling action and materially assists in keeping the cylinder, rotor and blades at proper working temperatures under even the most severe conditions involving high speeds and heavy loads. From the space 52 the exhaust fluid passes internally toward the right, viewing Figures 1 and 13, within the casing through passages formed between the feet 11, 12 and 13 on the end of the cylinder and through outlet passages 57 between the ribs 16, 17 and 18 at the end of the casing.

A tool, such as a cleaning head, is adapted for connection to the front end of the rotor at 58 in a manner well known in the art. Lubrication ducts 59, 60 and 61 are provided through the respective front and rear bushings to permit free access of lubricant carried by the operating fluid to the necks 44 and 45 of the rotor and drainage therefrom. A passage 62 communicates with the space 52 and with the space at the head end of the rotor to equalize the pressure on the rotor, as well known in the art. Holes 63 are provided in the plate 32, one of which is in communication with the passage 62 in either position of the plate so as to permit communication between the space 52 and the passage 62 at all times. Vents 64 (Figures 1 and 5) are provided in communication with the slots 48 to prevent fluid from becoming compressed at the bottoms of the grooves and thus insuring free reciprocatory movement of the blades 49.

The motor operates in the same general way as the well known Elliott motors such as Patent No. 1,979,537, the inlet fluid entering the cylinder through the ports 55 and impinging against the blades 49 so as to cause the rotor to rotate in the clockwise direction, viewing Figure 5 and anti-clockwise in Fig. 13. The blades are thrown outwardly of the rotor by centrifugal force and when the motor is in operation always have their rounded outer ends in contact with the inner wall of the cylinder. The fluid after pushing each blade around from the position of the upper blade in Figure 5 to that of the lower blade in such figure is exhausted through the exhaust ports 56 and thence through the longitudinal passages between the feet 11, 12 and 13 and the outlet passages 57.

While there has been shown and described a present preferred embodiment of the invention, it is to be distinctly understood that the same is not limited thereto but may be otherwise variously embodied within the scope of the following claims.

What is claimed is:

1. A rotary fluid motor having an outer casing, a cylinder within the casing, said cylinder having an eccentric flange at one end in engagement with the inner wall of the casing, means at the other end of said cylinder retaining the cylinder eccentrically in the casing to provide a space between said cylinder and the casing, a rotor having vanes located within said cylinder, a partition in the space between said cylinder and casing forming fluid pressure and exhaust chambers, a fluid inlet through the eccentric flange opening into said pressure chamber, inlet ports in the cylinder wall communicating with said pressure chamber, and exhaust ports communicating with the interior of said cylinder and with said exhaust chamber.

2. A rotary fluid motor having an outer casing, a cylinder within the casing, said cylinder having an eccentric flange at one end in engagement with the inner wall of the casing, means at the other end of said cylinder retaining the cylinder eccentrically in the casing to provide a space between the cylinder and the casing, a fluid pressure chamber in the casing adjacent one side of said flange, a rotor having vanes located within said cylinder, a partition in the space between said cylinder and the casing forming a second fluid pressure chamber, an air exhaust chamber adjacent the other side of said flange, a fluid inlet through the eccentric flange connecting the pressure chambers, inlet ports in the cylinder wall communicating with said second pressure chamber, and exhaust ports communicating with the interior of said cylinder and with said exhaust chamber.

3. A rotary fluid motor having an outer casing, a cylinder within the casing, said cylinder having an eccentric flange at one end engaging the inner wall of the casing, means at the other end of said cylinder retaining the cylinder eccentrically in the casing to provide a space between said cylinder and the casing, a rotor having vanes, said rotor being located within said cylinder, a partition extending substantially longitudinally and inclinely converging toward the wall of said cylinder, said partition forming fluid pressure and exhaust chambers, a fluid inlet in the eccentric flange and opening into said pressure chamber, inlet ports in the cylinder wall communicating with said pressure chamber, and exhaust ports communicating with the interior of said cylinder and with said exhaust chamber.

4. A cylinder for a rotary fluid motor having a cylindrical bore for a rotor, an eccentric flange at one end of said cylinder adapted to position the cylinder eccentrically within a motor casing, a partition, a pressure chamber between the cylinder wall and said partition, a fluid pressure inlet extending from said chamber through said flange, inlet ports communicating with said chamber and the bore of said cylinder, and exhaust ports extending from the bore of said cylinder through the wall of said cylinder.

5. A cylinder for a rotary fluid motor having a cylindrical bore for a rotor, an eccentric flange at one end of said cylinder adapted to position the cylinder eccentrically within a motor casing, a hood welded to the outer face of said cylinder, a pressure chamber between said cylinder and said hood, a fluid pressure inlet extending from said chamber through said flange, inlet ports communicating with said chamber and the bore of said cylinder, and exhaust ports extending from the bore of said cylinder through the wall of said cylinder.

PAUL T. KEEBLER.
ANNA L. ELLIOTT,
GEORGE F. ELLIOTT,
H. R. LEYDEN,
*Executors of the Estate of William S. Elliott, Deceased.*